United States Patent
Jentzsch et al.

(10) Patent No.: US 10,652,239 B2
(45) Date of Patent: May 12, 2020

(54) BLOCK-CHAIN ENABLED SERVICE PROVIDER SYSTEM INCLUDING PERMISSION DATA STRUCTURE AND STATE CHANNEL MONITORING

(71) Applicant: Slock.it, Inc., Dover, DE (US)

(72) Inventors: Christoph Jentzsch, Mittweida (DE); Simon Jentzsch, Mittweida (DE); Stéphane Tual, Twickenham (GB)

(73) Assignee: SLOCK.IT GMBH, Mittweida (DE)

( * ) Notice: Subject to any disclaimer, the term of this patent is extended or adjusted under 35 U.S.C. 154(b) by 218 days.

(21) Appl. No.: 15/857,334

(22) Filed: Dec. 28, 2017

(65) Prior Publication Data

US 2018/0191714 A1 Jul. 5, 2018

Related U.S. Application Data

(60) Provisional application No. 62/441,013, filed on Dec. 30, 2016.

(51) Int. Cl.
*H04L 29/06* (2006.01)
*G06F 21/44* (2013.01)
*H04L 9/32* (2006.01)

(52) U.S. Cl.
CPC ........ *H04L 63/0869* (2013.01); *G06F 21/445* (2013.01); *H04L 9/3239* (2013.01); *H04L 9/3247* (2013.01); *H04L 63/101* (2013.01); *H04L 63/126* (2013.01); *G06F 2221/2147* (2013.01); *H04L 2209/38* (2013.01)

(58) Field of Classification Search
CPC . G06Q 20/3829; G06Q 20/3827; G06F 21/45
USPC ........................................................ 713/182
See application file for complete search history.

(56) References Cited

U.S. PATENT DOCUMENTS

| | | |
|---|---|---|
| 2012/0265690 A1 | 10/2012 | Bishop et al. |
| 2015/0227890 A1 | 8/2015 | Bednarek et al. |
| 2015/0244690 A1 | 8/2015 | Mossbarger |
| 2015/0278820 A1 | 10/2015 | Meadows |
| 2016/0092988 A1 | 3/2016 | Letourneau |

(Continued)

FOREIGN PATENT DOCUMENTS

WO  WO 2015/161690 A1  10/2015

OTHER PUBLICATIONS

PCT International Search Report and Written Opinion, PCT Application No. PCT/US17/68798, dated Mar. 8, 2018, 22 pages.

*Primary Examiner* — Bryan F Wright
(74) *Attorney, Agent, or Firm* — Fenwick & West LLP

(57) ABSTRACT

A distributed ledger, e.g., blockchain, enabled operating environment includes a user device that accesses services of a service device by leveraging the decentralized blockchain. For example, a user device can lock/unlock a door (e.g., service device) by interfacing with a smart contract stored on the decentralized blockchain. The user device provides parameters, such as payment, that satisfies the variables of the smart contract such that the user device can access the service device. The service device regularly retrieves information stored in the smart contract on the decentralized blockchain. For example, the retrieved information can specify that the user device is authorized to access the service device or that the service device is to provide a service. Therefore, given the retrieved information, the service device provides the service to the user device.

20 Claims, 12 Drawing Sheets

(56) References Cited

U.S. PATENT DOCUMENTS

2017/0116693 A1* 4/2017 Rae .................... G06Q 20/3827
2017/0147808 A1* 5/2017 Kravitz .................. G06F 21/45
2018/0091316 A1* 3/2018 Stradling ........... G06Q 20/3829

* cited by examiner

BLOCK-CHAIN ENABLED SERVICE PROVIDER SYSTEM INCLUDING PERMISSION DATA STRUCTURE AND STATE CHANNEL MONITORING

CROSS REFERENCE TO RELATED APPLICATIONS

This application claims a benefit of U.S. Provisional Patent Application No. 62/441,013, filed Dec. 30, 2016, the content of which is incorporated by reference in its entirety.

TECHNICAL FIELD

This disclosure relates generally to exchanges, and more specifically, to controlling a service device, e.g., a hardware component, by performing an exchange on a decentralized ledger, e.g., a blockchain.

BACKGROUND

Exchanges using computing systems are often unsecure and prone to undesired alterations. If a particular exchange is compromised, it may be difficult to detect that the specific transaction is compromised. This leads to significant losses in terms of resources (e.g., money, human effort, time, etc.).

In many scenarios, the source of the hacking can arise from a middle man that handles the exchange. As an example, after booking a hotel room, an individual would need to interact with the desk attendant to pick up the keys to the hotel room. Here, the desk attendant can readily switch the hotel room to a smaller or less desirable hotel room than the one that was booked. Such a switch may not be readily evident to the individual. Thus, there is a need for ensuring safe transactions through the removal of the middle man that handles the exchanges.

BRIEF DESCRIPTION OF THE DRAWINGS

The disclosed embodiments have other advantages and features which will be more readily apparent from the following detailed description and the appended claims, when taken in conjunction with the accompanying drawings, in which:

Figure (FIG. 1A depicts an example blockchain enabled operating environment, in accordance with a first embodiment.

FIG. 0.1B depicts underlying processes on a blockchain that enable the provision of a service from a service device, in accordance with an embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Decentralized Ledger Enabled Operating Environment

This disclosure describes methods and systems for controlling a service device such as a lock, which can be opened by providing a payment, the payment being handled not through a central entity/server, but through code performing on a decentralized ledger (e.g., blockchain). For ease of discussion, the disclosed configurations will be described in the context of a blockchain, although the principals noted may be applicable to other decentralized ledgers.

Figure 1A:
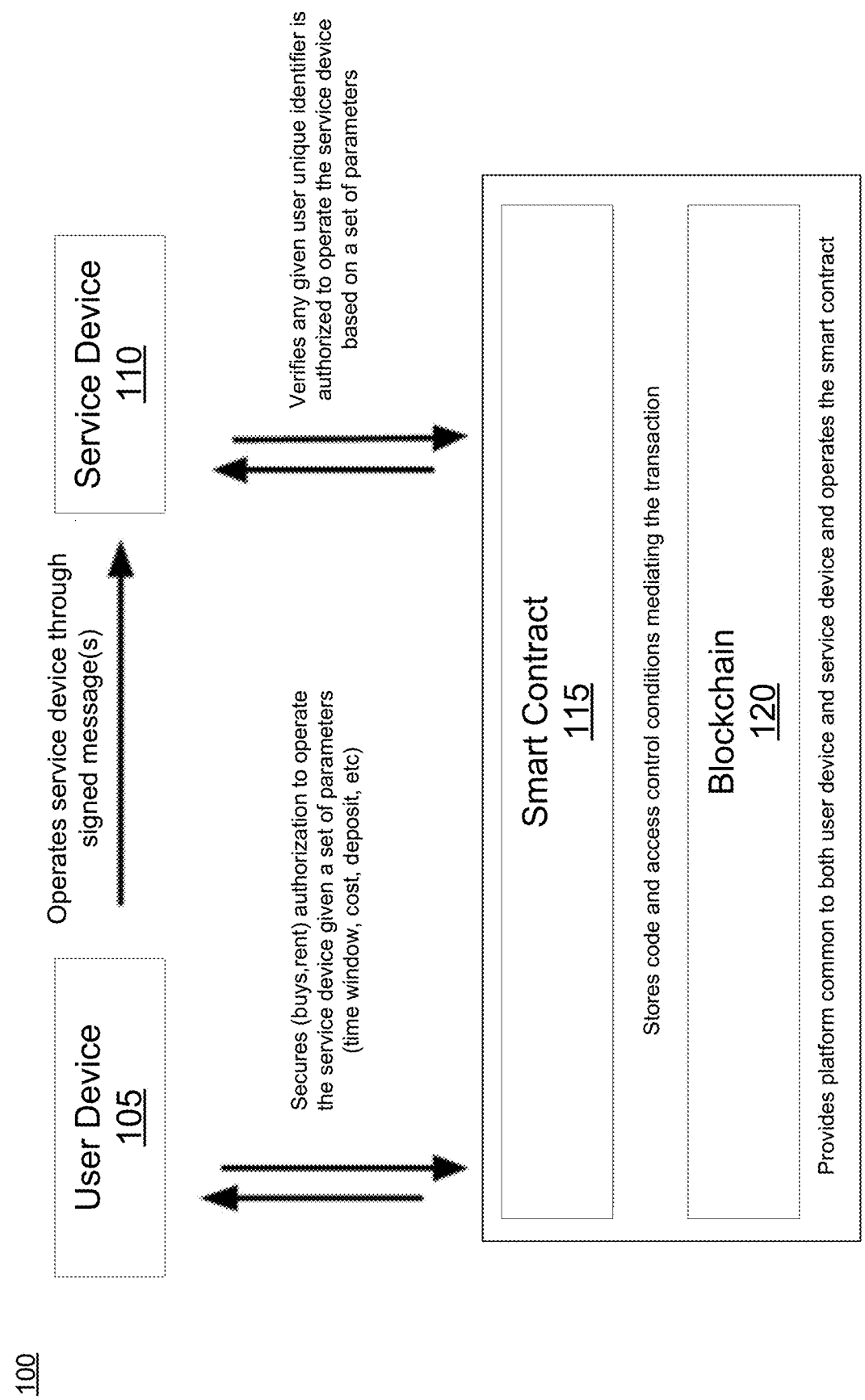
FIG. 1C is a block diagram illustrating example components of an example computing device within the blockchain enabled operating environment, in accordance with an embodiment.

FIG. 1A illustrates an example blockchain enabled operating environment 100 in accordance with the configurations described herein. The example operating environment 100 includes a user device 105 and a service device 110. Furthermore, the example operating environment 100 includes a smart contract 115 on a decentralized blockchain 120 in communication with both the user device 105 and the service device 110. The user device 105 and the service device 110 are types of examples of blockchain enabled computing devices for operation in the example operating environment 100.

User Device

The user device 105 can be a device with the capability, inherent or mediated, to interact with a blockchain. As an example, a user device 105 is a client device such as a smartphone, tablet, cell phone, laptop, or desktop computing device. In various embodiments, the user device 105 communicates with the blockchain 120 through an application installed on the user device 105 that includes a specific communication protocol. Transactions from the user device 105 execute value transfer to the service device 110, as well as manage access control (for example, registering a booking for a location where the access to the location is controlled by the service device 110).

The user device 105 also may read parameters of a service device 110 from the blockchain 120, as is further described herein. A parameter may include, for example, a deposit, cost of rental or sale, availability dates and/or times, or other information relevant to complete and/or execute a transaction. The information is read from a shared blockchain state, structured in code in the form of a smart contract 115. A smart contract 155 provides rules (e.g. computer program code, including, for example, authorizations) to configure the service device 110 for execution within the blockchain enabled operating environment.

In various example embodiments, the user device 105 also may communicate directly with the service device 110 through a communication protocol over any given wireless communication layer. For example, the communication may occur through BLUETOOTH or near field communication (NFC) technology using an application installed on the user device 105 that includes a specific communication protocol.

Service Device

The service device 110 may represent an object with a capability, inherent or mediated, to interact with a blockchain. The service device 110 may provide a service based on operating commands. For example, the service device 110 may be structured to provide access control. Access control may include, for example 'open' and/or 'close' (e.g., a lock or lock mechanism), pass through permission (e.g., a gate), or 'start' and/or 'stop' and/or 'go up/down' and/or 'turn left/right' (e.g., operational functions). As more specific examples, a service device 110 may provide a user of the user device 105 access to a hotel room (e.g., by unlocking the door) and/or its equipment (e.g., minibar, television, room service) or a college dorm building (e.g., authorized entry). Alternatively, the service device may provide a user of the user device 105 access to a location of interest such as a highway (e.g., by opening a gate).

As another example, the service device 110 may be structured to provide an action that specifies a particular option amongst a variety of options (e.g., beyond a simple binary 'open/close' option). For example, the service device 110 may be a coffee machine and can provide the user of the user device 105 a caffeinated beverage of various volumes (e.g., small, medium, large, and/or other options). As another example, the service device 110 may be configured to turn on a ceiling fan, and set the speed of the ceiling fan to a particular rotations per minute. The services that can be provided by a service device 110 are not limited to the aforementioned examples and may further include, but are not limited to, on demand access to medical equipment, control of drones/vehicles, control of shipping containers, and any process that can be made autonomous.

The service device 110 can have the necessary hardware and software on-boarded to be rented, sold and/or interacted with by the user device 105. For example, the service device 110 may include communication protocols that are specific for communicating with the blockchain 120. In another embodiment, the service device 110 may not have direct access to the blockchain 120 but can leverage a proxy device that includes the appropriate protocols to communicate with the blockchain 120. As one example, the proxy device is a rack server or a cloud server (e.g., SAMSUNG ARTIK Cloud or a cloud service provided by a manufacturer of the service device). In other words, the functions performed by proxy device may be distributed across multiple processors and/or electronic devices. In various embodiments, the one or more processors or processor-implemented modules may be distributed across a number of geographic locations. In some embodiments, the one or more processors of the proxy device may be located in a single geographic location (e.g., within a home environment, an office environment, or a server farm). In one embodiment, a proxy device can be a home server (e.g., a computing device) operating the necessary software to communicate with one or more service devices and sending the transactions to the blockchain 120. An example of the proxy device is described in further detail below in reference to FIG. 5A.

In one example embodiment, the service device 110 can provide a service directly through electronically signed messages from the user device 105 followed by a read request to the blockchain (to verify the user device 105 is indeed allowed to access the service device 110). This scenario is described in further detail below in relation to FIG. 3. In one embodiment, the service device 110 can provide a service by regularly "polling" the blockchain and providing the service upon a relevant state change in the form of a modification to a value stored by the smart contract 115. The modification of a value stored by the smart contract 115 can be initiated by the user device 105. This scenario is described in further detail below in relation to FIG. 4B.

The service device 110 can be discovered in two different ways. The first, through a smart contract registry implemented as a smart contract itself. The second, through automatic discovery via blockchain analysis for specific smart contract method (functions) signatures.

Smart Contract

Each service device 110 may be represented on a blockchain 120 (public or private, regardless of implementation as long as it can de-centrally execute code) in the form of program code (or code). The code comprises instructions that are executable by a computer (or computer device) that may include, for example, a processor, controller or state machine. The code may include the rules for configuring particular computer devices within the blockchain enabled operating environment to operate in a particular way. The code in some example embodiments may be referred to as a smart contract 115. The service device's 110 condition of operations, triggered by a transaction from a user device 105, are stored and enforced in the smart contract 115. The smart contract 115 also may hold optional variables, such as a reference to the owner of the service device 110 and/or the parameters governing conditions for the operation of the service device 110 (e.g., deposit, cost of rental or sale, availability dates and/or times, etc.). As one skilled in the art will readily recognize, the use of the phrase smart contract 115 is particular to the field of blockchain technology, but can further refer to any form of code that enforces an agreement. In this case, the smart contract 115 enforces an agreement between a user device 105 (who provides a payment) and an owner's service device 110 (that provides a service).

Figure 1B:
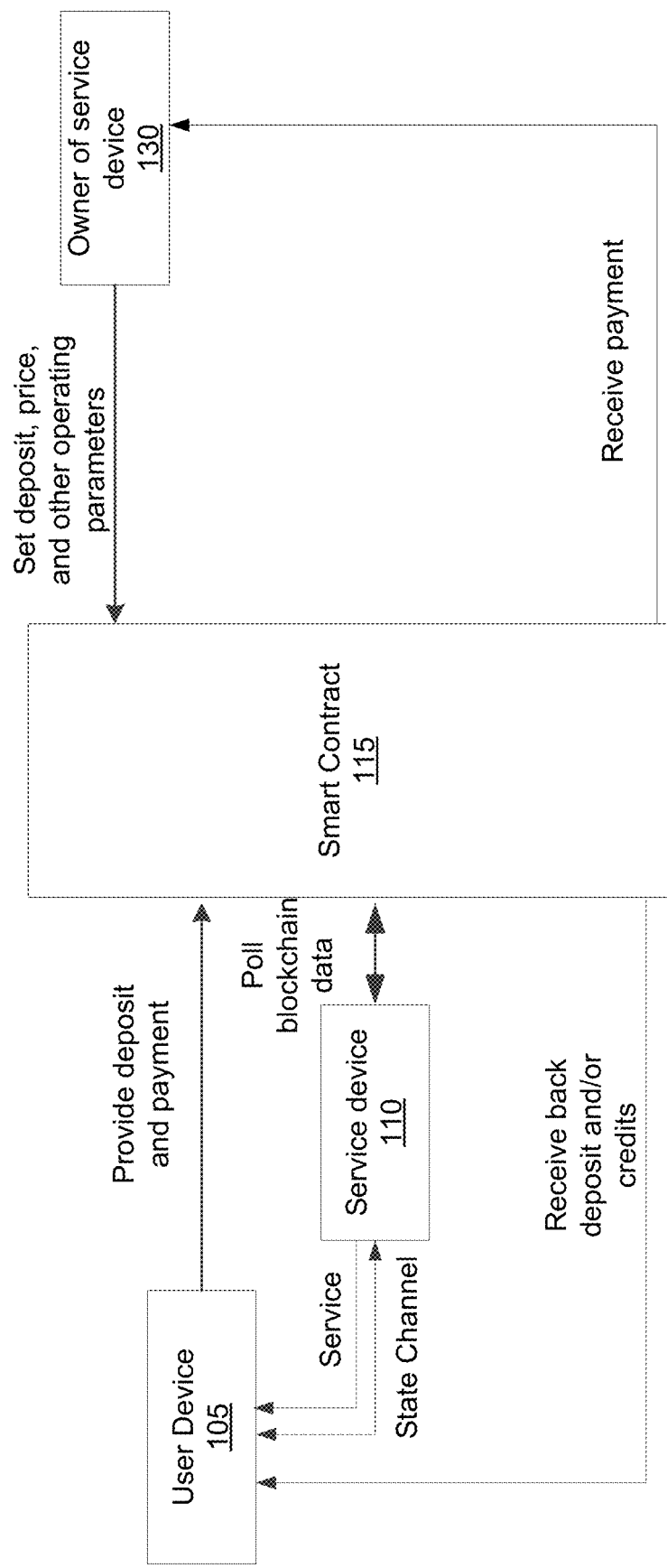

As an example of operation, the smart contract may manage access rights to the service device 110. Referring to FIG. 1B, the smart contract 115, which operates on the blockchain 120, enables the transferring of payments/funds from a user device 105 that is requesting a service from a service device 110 that belongs to an owner 130 of the service device. The smart contract 115 may continuously update its stored values in response to receiving and/or paying out payments, e.g., conventional currency in electronic form and/or a cryptocurrency payments. It is noted that a cryptocurrency may be for example and electronic coin offering, an electronic reward, a barter tender, or some other form of value in electronic format.

By way of example, when the owner 130 of the service device desires to make the service device 110 available to provide a service, the owner 130 can provide a deposit amount and a price to access the service device 110 that is recorded as variables in the smart contract. When a user device 105 has sent enough funds (e.g., provided a deposit) that satisfies the variables stored by the smart contract 115 representing the service device 110, the user device 105 may in response transmit to the service device 110 operating commands (e.g., in the form of program code that comprises instructions) that may execute within the service device 110 to perform a particular action. In various embodiments the user device 105 and the service device 110 establish a state channel that enables the user device 105 to transmit more than one operating command to the service device 110. Further details entailing the logic behind the smart contract 115 and access to the service device 110 is described below.

By virtue of operating in a blockchain enabled environment, the smart contract 115 may mediate the value transfers between the user device 105 and the owner 130 of the service device (which can take place using currency such as virtual currencies and/or tokens or equivalent). Therefore, the owner 130 of the service device may receive the payment (e.g., conventional currency in electronic format or a cryptocurrency) and the user device 105 receives the deposit back and/or any outstanding credits from the payment.

Blockchain

Returning to FIG. 1A, the underlying blockchain 120 hosting the smart contract 115 can be public or private. The blockchain 120 may include a ledger in addition to the smart contract 115. The solution described herein is blockchain 120 agnostic by design. As an example, the blockchain 120 refers to a decentralized network that facilitates wired or wireless communications among one or more devices in communication with the blockchain 120 (e.g., user device 105 or service device 110) that de-centrally execute code.

In various embodiments, the network of the decentralized blockchain 120 uses standard communication technologies and/or protocols. Examples of technologies used by the network include Ethernet, 802.11, 3G, 4G, 802.16, or any other suitable communication technology. Examples of protocols used by the network include transmission control protocol/Internet protocol (TCP/IP), hypertext transport protocol (HTTP), simple mail transfer protocol (SMTP), file transfer protocol (FTP), or any other suitable communication protocol.

Figure 1C:
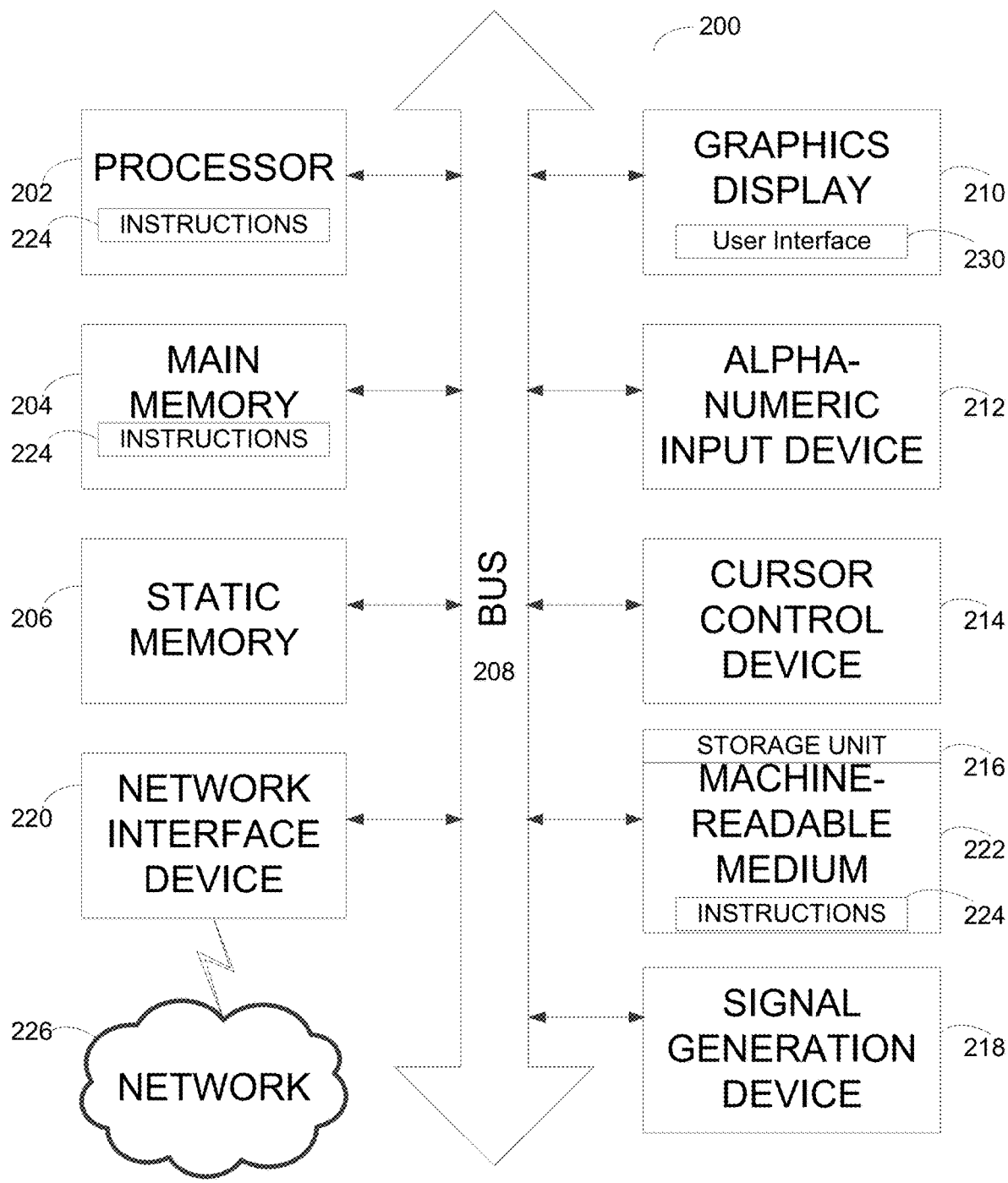

Example User Device, Service Device, and/or Device in Communication with Blockchain FIG. 1C is a block diagram illustrating example components of an example computing device 200 within the blockchain enabled operating environment 100. Some or all of the example computing device components described may be within, for example, the user device 105, the service device 110, and/or any device that may be used by the user device 105 or service device 110 as a proxy to communicate with the blockchain 120. In other words, the computing device 200 is a node on the blockchain 120. The computing device 200 may be configured to read instructions from a machine-readable medium and execute them in at least one processor (or controller). Specifically, FIG. 1C shows a diagrammatic representation of a computing device 200 in the example form within which one or more instructions 224 (e.g., software or program or program product) for causing the computing device 200 to perform any one or more of the methodologies discussed herein may be executed.

The example computing device 200 may include at least one processor 202 (e.g., a central processing unit (CPU), a graphics processing unit (GPU), a digital signal processor (DSP), one or more application specific integrated circuits (ASICs), one or more radio-frequency integrated circuits (RFICs), a controller, a state machine, or any combination of these), a main memory 204, and a static memory 206, which are configured to communicate with each other via a bus 208. The computing device 200 may further include graphics display unit 210 (e.g., a plasma display panel (PDP), a liquid crystal display (LCD), or a projector. The computing device 200 also may include input device, for example, alphanumeric input device 212 (e.g., a keyboard), a cursor control device 214 (e.g., a mouse, a trackball, a joystick, a motion sensor, touch sensitive interface, or other pointing instrument). The computing device 200 also may include, for example, a storage unit 216 (e.g., a solid state disk, a magnetic disk, an optical disk), a signal generation device 218 (e.g., a speaker), and a network interface device 220, which also are configured to communicate via the bus 208. It is noted that a computing device 200 need not include all the illustrated and described components of the computing device 200.

The storage unit 216 includes a machine-readable medium 222 on which is stored instructions 224 (e.g., software) embodying any one or more of the methodologies or functions described herein. The instructions 224 (e.g., program code or software) may also reside, completely or at least partially, within the main memory 204 or within the processor 202 (e.g., within a processor's cache memory) during execution thereof by the computing device 200, the main memory 204 and the processor 202 also constituting machine-readable media. The instructions 224 (e.g., software) may be transmitted or received over a network 226 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Operational Example for a Service Through a Blockchain Enabled System

Figure 2:
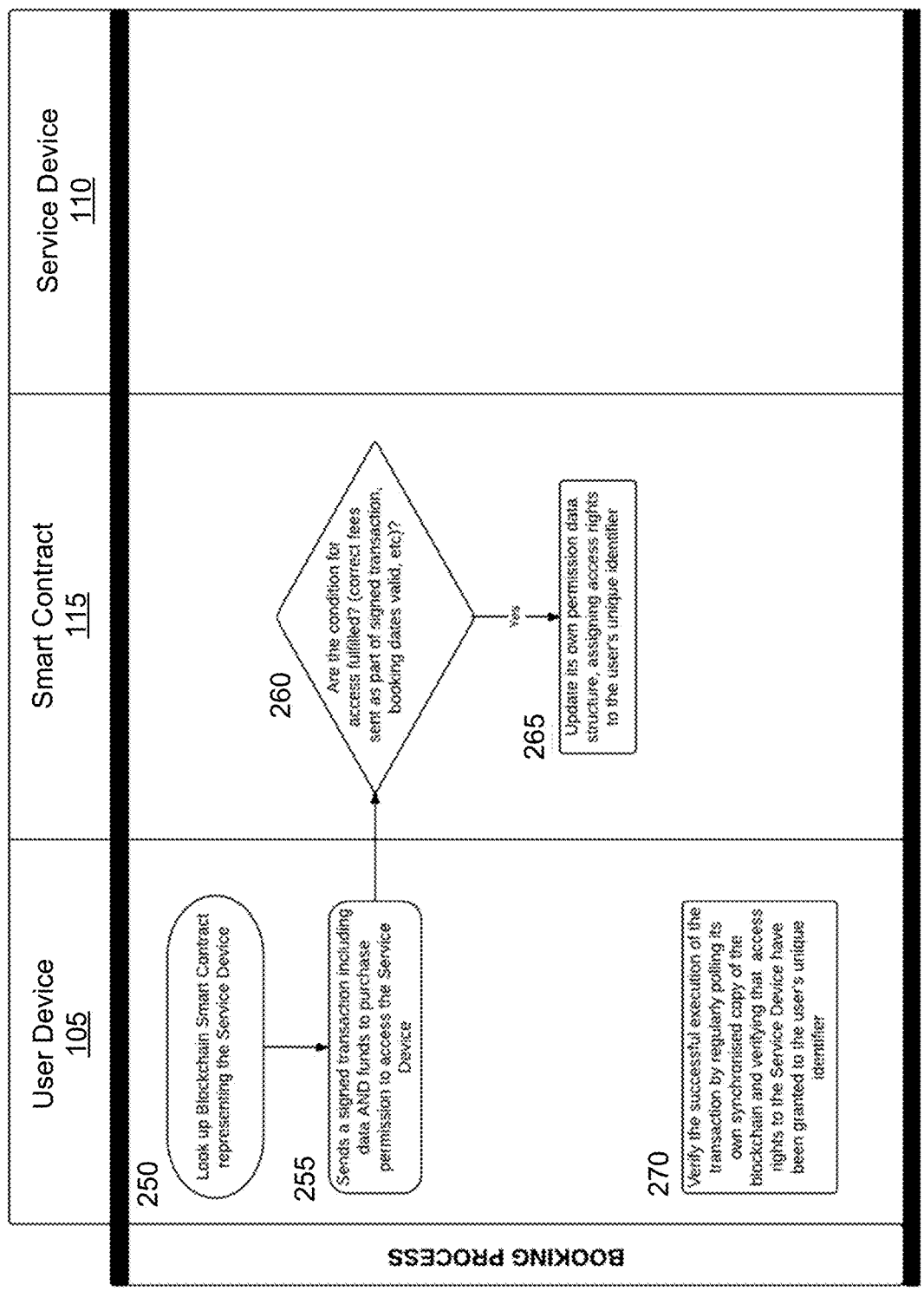
FIG. 2 is an example interaction diagram that depicts the booking process, in accordance with an embodiment.

FIG. 2 is an example interaction diagram that depicts a booking process, in accordance with an example embodiment. The booking process enables a user device 105 to gain access to a service device 110, in one embodiment. More specifically, the user device 105 communicates with the smart contract 115 representing the service device 110 on the blockchain 120 in order to gain access to the service device 110 during the booking process. After gaining access, the user device 105 proceeds through the access process in order to receive the service provided by the service device 110. In the various embodiments described below, the access process may differ whereas the booking process remains the same.

Example of the Booking Process Between User Device and Smart Contract

The user device 105 looks up 250 a smart contract 115 on the blockchain 120 that represents the service device 110. As one example, the user device 105 can access a dynamic registry and identifies the smart contract 115 and the corresponding service device 110. The dynamic registry may be accessed from a third party system (e.g., an application/website, a hotel booking provider, or car rental booking provider).

The user device 105 gains access to the variables of the smart contract 115 corresponding to the service device 110 which specifies the parameters of the service device 110 such as a payment deposit, availability dates of the service device, and/or other information.

The user uses his/her user device 105 to send 255 an electronically signed request to the smart contract 115 on the blockchain 120 to purchase permission to access the service device 110 (e.g., a lock, washing machine, car charging port, rental service, and any device that can provide a service). The user device 105 generates a request that includes a user identifier assigned to the user. For example, the user identifier can refer to an identifier assigned to the user when the user registers as a member of the blockchain. Additionally, the generated request includes payment as well as variables that specifies the desired parameters of the service.

The user device 105 electronically signs the request using a key (e.g., a private/public key) that is assigned to the user. For example, the user device 105 may electronically sign the request by encrypting the request using the private key assigned to the user. In various embodiments, the user device 105 may further include the public key assigned to the user in the electronically signed request. Thus, the user device 105 sends the electronically signed request.

The smart contract 115 on the blockchain 120 processes the request provided by the user device 105. The smart contract 115 on the blockchain 120 receives and decrypts the electronically signed request. For example, the electronically signed request is decrypted using the included public key of the user to obtain the content of the request (e.g., user identifier of the user, payments, and specified parameters).

The smart contract 115 determines 260 whether the conditions for providing access are fulfilled. For example, the smart contract 115 on the blockchain 120 checks whether the correct funds that satisfy the variables of the smart contract 115 have been included in the electronically signed request. As another example, if the user device is sending an electronically signed request to rent a hotel room for a period of time, the smart contract 115 checks the parameters included in the request that specify the dates of stay requested by the user and compares the dates to dates of availability that are stored in the variables of the smart contract 115 which were previously set by the owner of the service device 130. If the specified dates are available (e.g., no one is renting the hotel room at that time), the smart contract 115 deems the conditions as fulfilled.

The smart contract 115 updates 265 its permission data structure to reflect that payment has been received from the user device 105 and that access to the service device 110 is now granted. As an example, the permission data structure may be a key-value pair database that includes user identifiers that have been granted access to the corresponding service device 110. Therefore, the smart contract 115 can update the permission data structure with the user identifier included in the electronically signed request, thereby indicating that the user identifier is granted access to the service device 110.

Given that the user device 105 has access to the blockchain 120 (e.g., the user device 105 is a node on the blockchain 120), the user device 105 continuously polls data from the blockchain 120 to update the local synchronized copy of the blockchain 120 and verifies 270 that the access rights to the service device 110 have been granted to the user identifier. Thus, the booking process is complete.

Example of the Access Process Between User Device and Smart Contract

Figure 3:
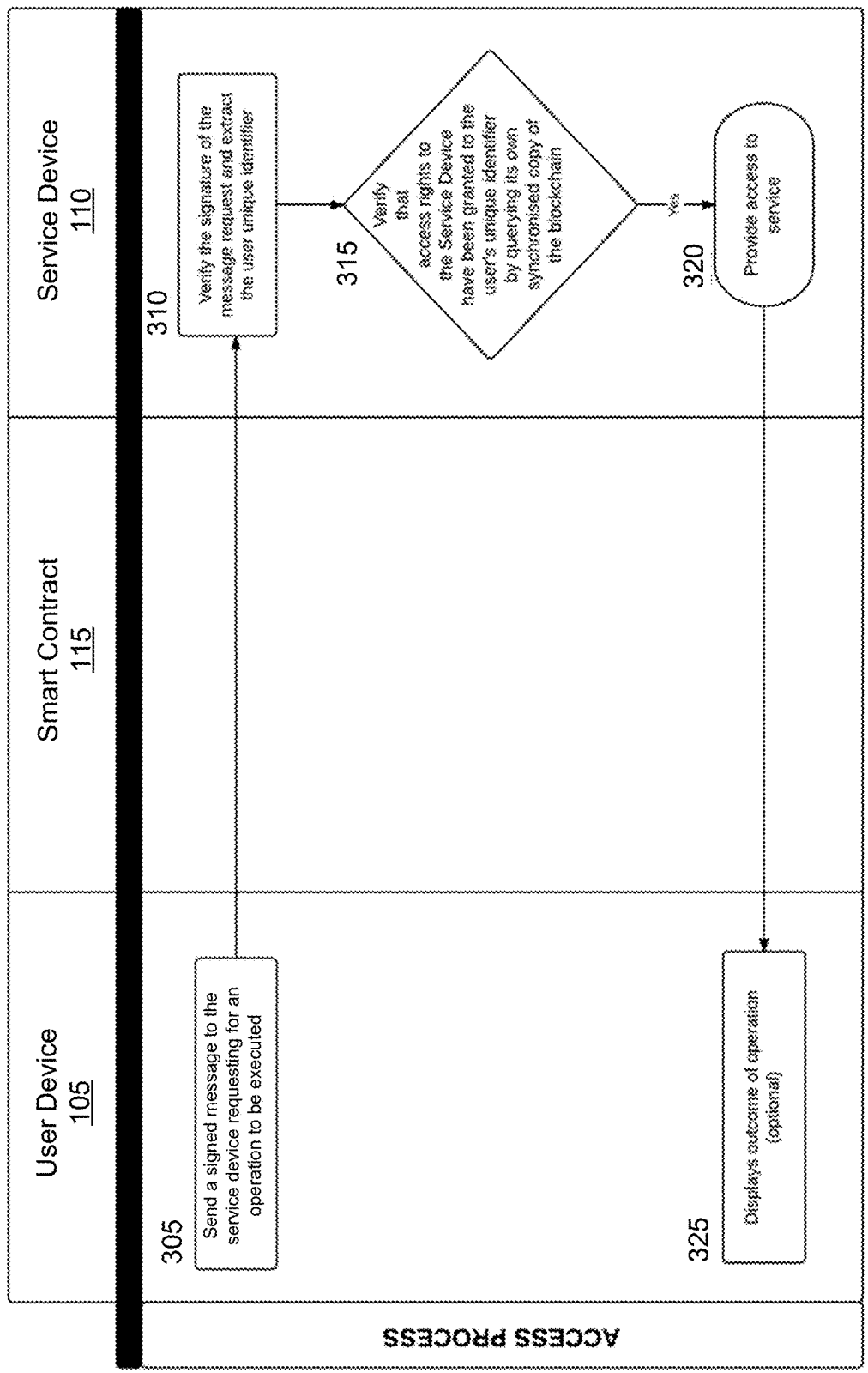
FIG. 3 is an example interaction diagram that depicts the access process, in accordance with a first embodiment.

FIG. 3 is an example interaction diagram that depicts the access process, in accordance with a first embodiment. The access process refers to the process in which the user device 105 initiates a request to the service device 110 and receives a service provided by the service device 110. In the embodiment shown in FIG. 3, the user device 105 sends a request directly to the service device 110. The service device can then verify whether the user device 105 has the right to operate the service device 110. In this embodiment, the service device 110 has access to the blockchain 120 (e.g., is a node in the blockchain 120) and therefore continuously polls data from the blockchain 120 to update a locally synchronized copy of the smart contract 115.

As shown in FIG. 3, the user device 105 sends 305 an electronically signed message to the service device 110 to request the service. To do so, the user device 105 generates a message. In various embodiments, the message identifies the service device 110 and additional information describing the requested service. Additionally, the message can include the user identifier assigned to the user. The user device 105 electronically signs the message by encrypting the message using a private key assigned to the user. The user device 105 can further include the public key assigned to the user in the electronically signed message.

The electronically signed message can be sent in response to different user inputs. For example, a user may open an installed application on the user device 105 that includes communication protocols with the blockchain 120 and the service device 110 which then triggers the electronically signed message. If the service device 110 can provide more than one service, the user can further provide input specifying the service that is desired. The sending of the electronically signed message can occur over a wireless technology standard (Bluetooth/NFC/Wifi, all their variants and derivatives or similar technology), using a communication protocol (ETHEREUM's WHISPER, TELAHASH, or any similar technology).

The service device 110 receives the electronically signed message and verifies 310 the signature of the electronically signed message. For example, the service device 110 may verify the signature through cryptographic signature verification. Additionally, the service device 110 may extract the user identifier by deriving it from the signed message. Here, the service device 110 can decrypt the electronically signed message using the public key and obtain the user identifier. The service device 110 verifies 315 that the user device 105 has been granted access to the service device 110. For example, the service device 110 retrieves the local, synchronized copy of the smart contract 115 that is continuously polled from the blockchain 120. Therefore, the service device 105 compares the extracted user identifier from the electronically signed message to the user identifier that is listed in the permission data structure of its local copy of the smart contract 115.

Once the user identifier corresponding to the user device 105 is verified to have access to the service device 110, the service device 110 provides 320 the requested service. Additionally, the service device 110 may provide information to the user device 105 indicating that the service was provided by the service device 110. Optionally, the user device displays 325 the outcome of the process (e.g., on a user interface 230 of the user device 105) such as an indication that the request was successful and the service was provided.

Figure 4A:
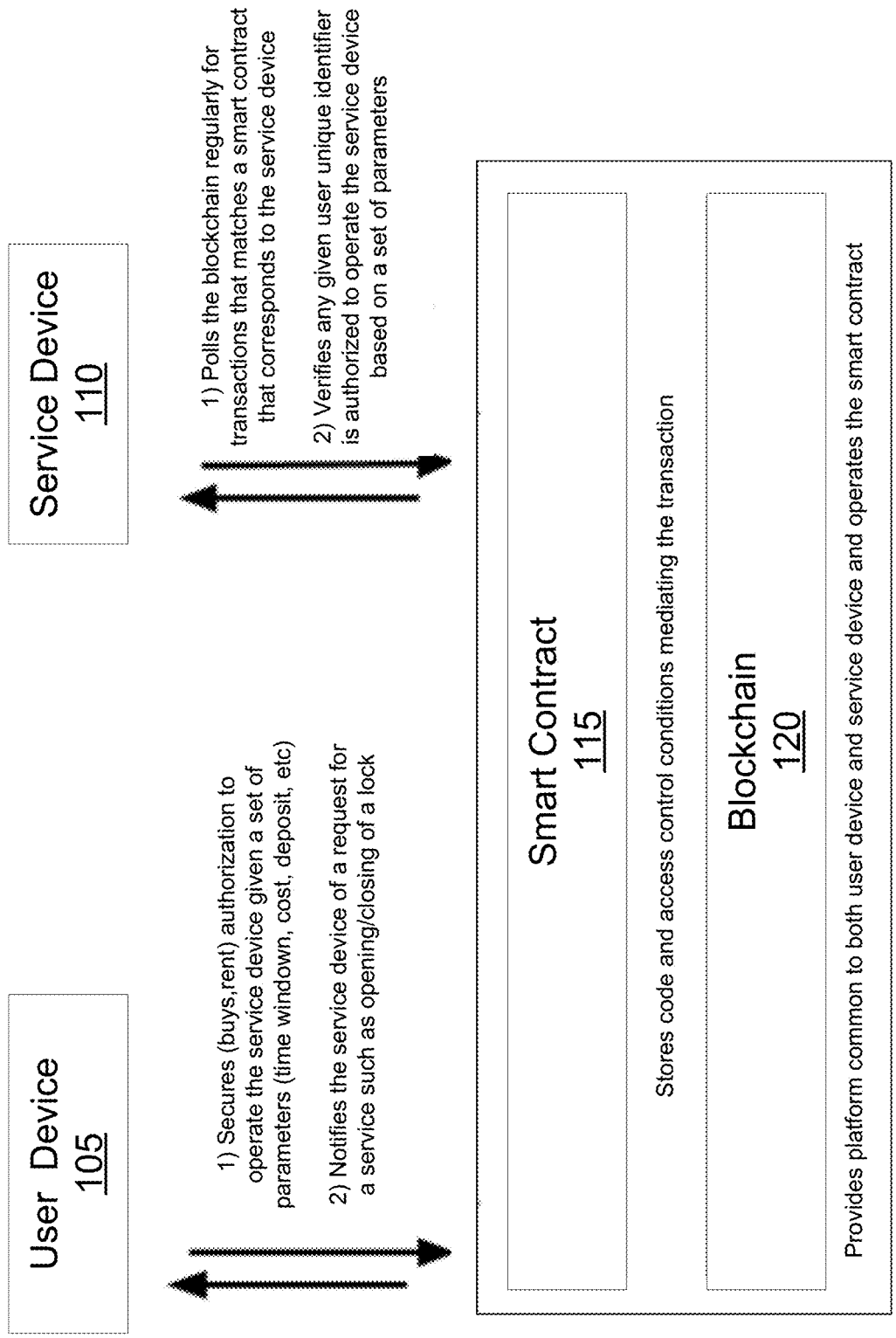
FIG. 4A depicts an example blockchain enabled operating environment, in accordance with a second embodiment.
Figure 4B:
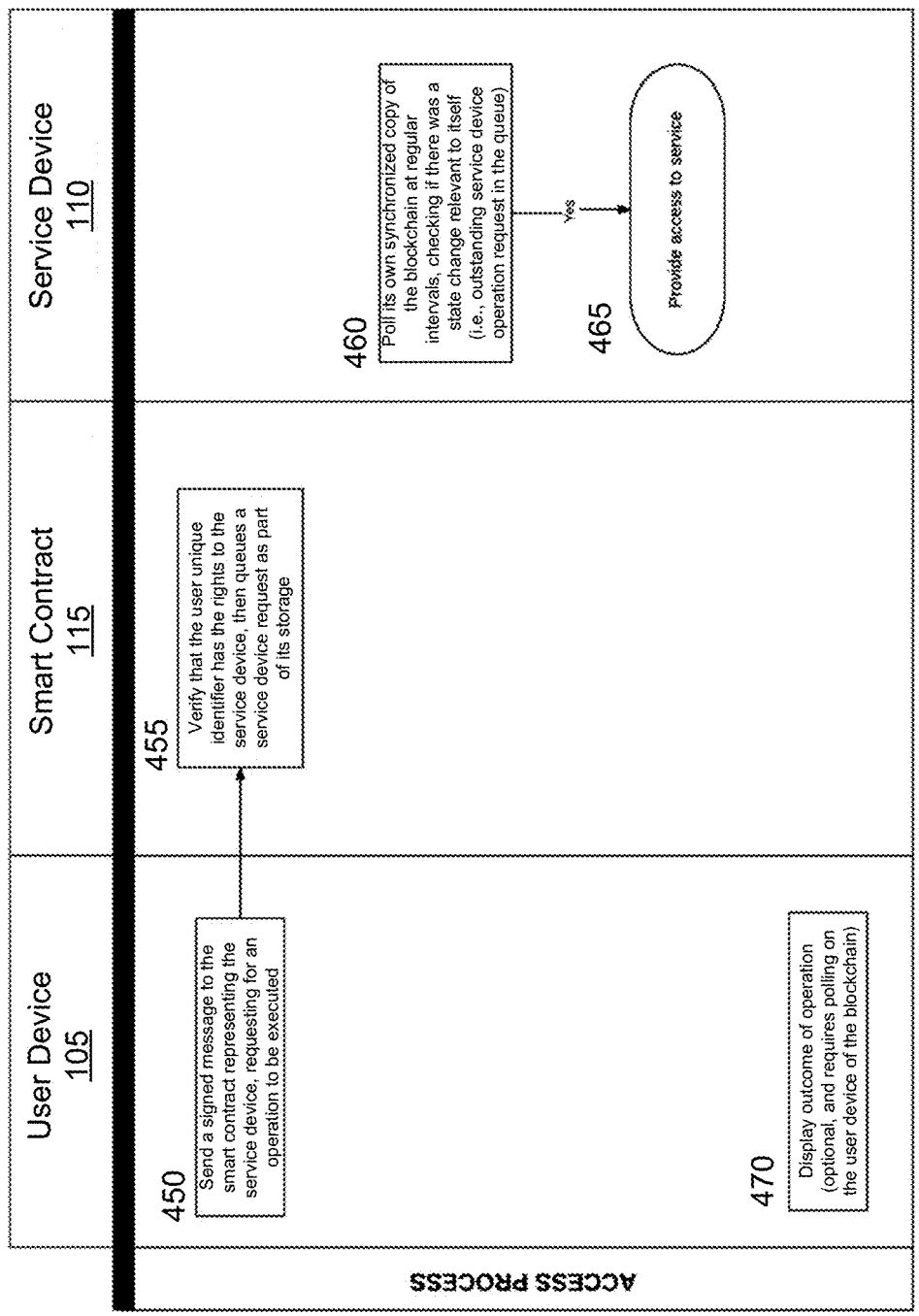
FIG. 4B is an example interaction diagram that depicts the access process, in accordance with the second embodiment shown in FIG. 4A.

Operational Example of a Blockchain-Only Operation (e.g., FIG. 4A and FIG. 4B)

FIG. 4A depicts an example blockchain enabled operating environment, in accordance with a second example embodiment. Here, FIG. 4A differs from FIG. 1A in that the user device 105 and the service device 110 each communicate with the blockchain 120 such that a service is provided by the service device 110. In other words, in this mode of operation, a user uses his/her user client device 150 to receive a service provided by the service device 110 using solely transactions sent to the smart contract 115 on the blockchain 120.

The user device 105 proceeds through the booking process as previously described in FIG. 2. During the access process, the user device 105 emits a request through electronically signed messages to the blockchain 120. The service device 110 regularly polls data from the blockchain 120 to update its local, synchronized copy of the blockchain 120 for alteration of the state of a matching smart contract 115, and acts according, after verifying that a user identifier is authorized to conduct the operation requested as part of the request.

More specifically, reference is made to FIG. 4B which is an example interaction diagram that depicts the access process, in accordance with the second embodiment shown in FIG. 4A. The user device 105 can generate a message requesting a service from the service device 110. The message can include the user identifier assigned to the user of the user device 105, an identification of the service device 110, and information descriptive of the service to be provided by the service device 110. The user device 105 electronically signs the message by encrypting the message using the private key assigned to the user and further includes the public key assigned to the user.

The user device 105 sends 450 the electronically signed message including its public key to the smart contract 115 on the blockchain 120 that represents the service device 110. The smart contract 115 on the blockchain 120 receives the electronically signed message, verifies the electronically signed message (e.g., through cryptographic signature verification methods), decrypts the electronically signed message using the public key, and extracts the user identifier. The smart contract 115 verifies 455 that the extracted user identifier has access rights to the service device 110. For example, the smart contract 115 accesses its permission data structure as part of its storage and compares the extracted user identifier to the user identifier that is listed in the permission data structure. The smart contract 115 queues up a service device request as part of its internal data store.

The service device 110 has access to the blockchain 120 (e.g., a node in the blockchain) and therefore stores a local, continuously synchronized copy of the smart contract 115. The service device polls 460 the blockchain 120 to update the locally synchronized copy with any state changes that occurred in the corresponding smart contract 115 on the blockchain 120. For example, a state change may indicate that a new user device now has access to the service device 110. Additionally, a state change may indicate an outstanding service device request that was queued up by the smart contract 115 on the blockchain 120.

If the service device 110 detects an outstanding service device request, the service device 110 provides the requested service. Optionally, the user device displays 470 the outcome of the request such as an indication that the service has been provided. The user device may obtain this information through regular polling of its own copy of the blockchain 120 and noting that the service device request that was previously queued up has now been completed.

Figure 5A:
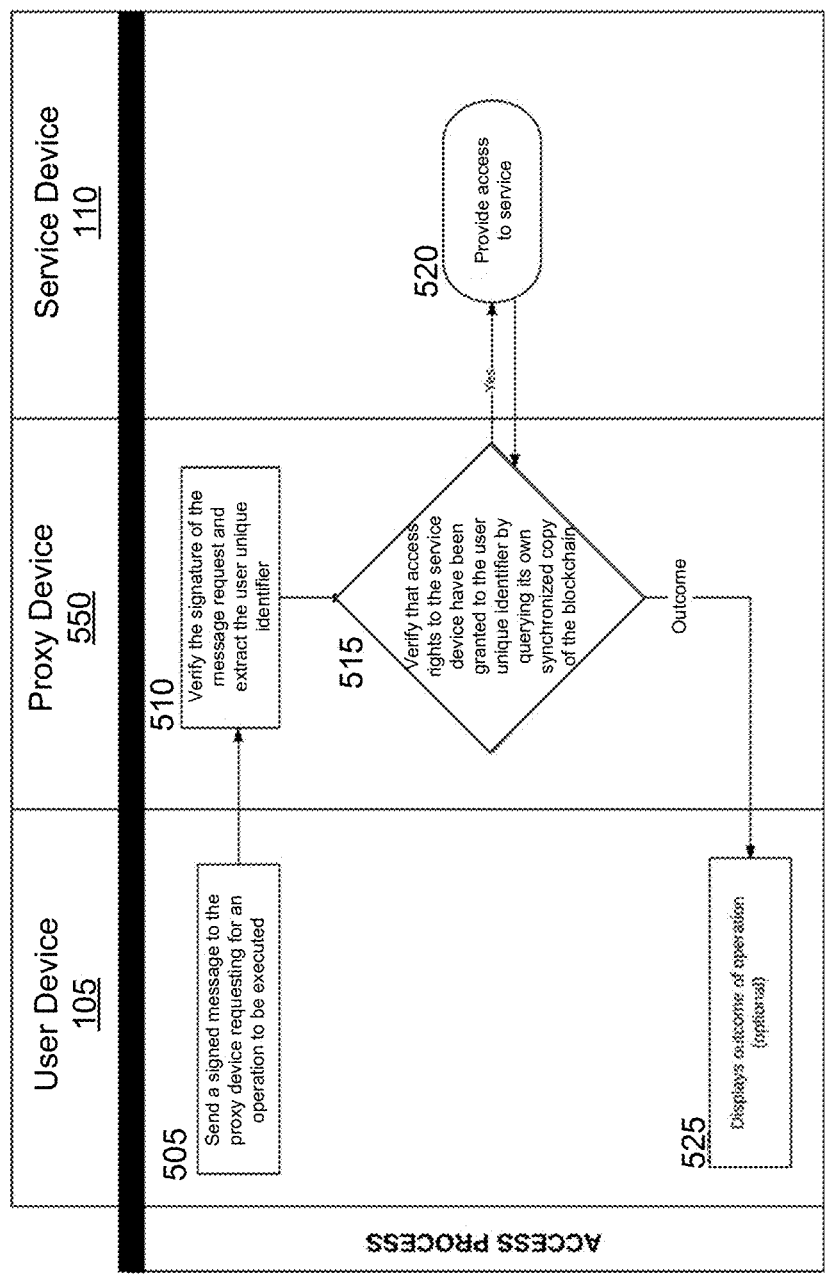
FIG. 5A is an example interaction diagram that depicts the access process using a proxy device, in accordance with an embodiment.

Operational Example of a Proxy Device in Communication with One or More Service Devices FIG. 5A is an example interaction diagram that depicts the access process using a proxy device, in accordance with an example embodiment. In this example embodiment, a proxy device 550 communicates on behalf of one or more service devices 110. For example, the proxy device 550 may be previously registered and pre-authorized to communicate with the service device 110 (and one or more other service devices 110 as well). In such example embodiments, the implementation of a proxy device 550 can be beneficial for service devices 110 that are not able to directly communicate with the blockchain 120. As previously described, the proxy device 550 may be a computing device 200 configured to communicate with the user device 105 and the smart contract 115 on the blockchain 120 such that the user device 105 can request for a service and the proxy device 550 can conduct the appropriate logic to cause the service device 110 to provide the requested service.

The user device 105 proceeds through the booking process as previously described in FIG. 2. Referring specifically to the interaction diagram shown in FIG. 5A, during the access process, the user device 105 transmits (or sends) 505 an electronically signed message including its public key to the proxy device 550. Such an electronically signed message can be generated by the user device 105 according to the description above in relation to step 450 of FIG. 4B. The proxy device 550 receives the electronically signed message, extracts the user identifier, and verifies 510 that the extracted user identifier has access rights to the service device 110. Here, the proxy device has access to the blockchain 120 (e.g., a node in the blockchain 120) and therefore stores a local synchronized copy of the blockchain 120. The proxy device verifies 515 that the extracted user identifier has access rights by comparing the extracted user identifier to the local, synchronized copy of the smart contract that includes the user identifier.

Once the proxy device 550 has verified that the user device 105 has access to the service device 110, the proxy device 550 transmits an operational request to the service device 110. In response to the operational request, the service device provides 520 the service. The service device 110 transmits, back to the proxy device 550, a response to the operational request indicating that the service has been provided. The proxy device 550 may further transmit the response to the user device 105. The user device 105 can optionally provide for display 525 the outcome of the operation.

Figure 5B:
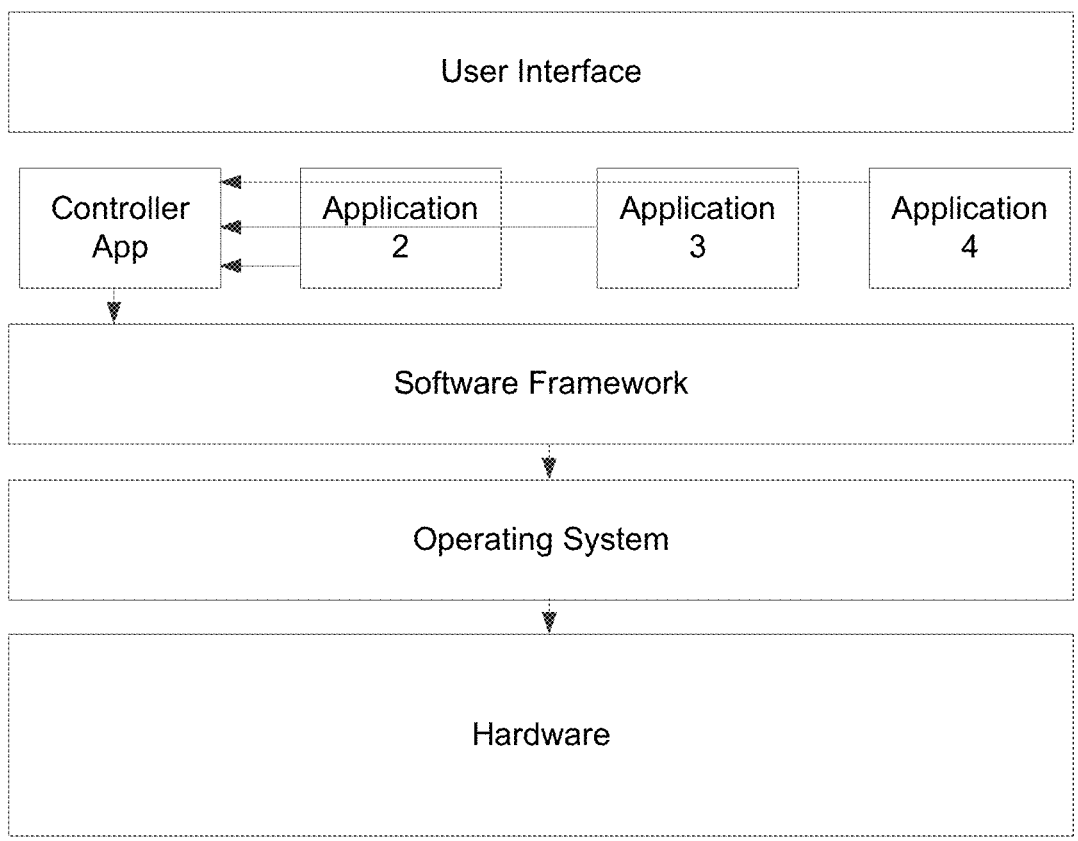
FIG. 5B depicts an example of hardware and software layers of a proxy device, in accordance with an embodiment.

FIG. 5B depicts an example of hardware and software layers of a proxy device, in accordance with an example embodiment. As stated above, in various embodiments, the proxy device is a cloud server. Therefore, the hardware layer of the proxy device, which can include the processors of the proxy device, can be distributed across multiple geographical locations. Generally, the hardware and/or software layers enable the proxy device 550 to communicate with the blockchain 120. The blockchain 120 may execute on one or more distributed computing devices and may include one or more smart contracts 115 and a distributed ledger (e.g., blockchain 120).

By way of example, the proxy device 550 may include hardware (e.g., embedded board processor such as RASPBERRY PI, INTEL EDISON, SAMSUNG ARTIK, etc.) and/or the various devices described in FIG. 2A such as the processor 202, graphics display 210, and machine readable medium 222 configured to enable communication between the blockchain 120 and a service device 110 that may or may not have direct access to the blockchain 120. The proxy device 550 also includes an operating system. For example, example of an operating system used by the proxy device 550 is the UBUNTU Snappy core. In another example, the operating system used by the proxy device 550 may be GOOGLE ANDROID or APPLE IOS. Through the operating system, the proxy device 550 can communicate with one or more different service devices 110. For example, the proxy device 550 can detect and communicate with all compatible service devices 110 that are available (e.g., in a home, in a hotel) through an application or communication protocols. Therefore, an owner of the proxy device 550 can set the parameters (e.g., deposit, cost of rental, time availability) for each of the service devices 110 that are in communication with the proxy device 550.

Additionally, the proxy device 550 includes a software framework that enables communication with the blockchain 120. For example, the proxy device 550 may include a software framework that communicates with a controller application that may enable communication between one or more third party applications and the software framework layer that communicates with the blockchain 120. Additionally, the proxy device 550 may include a user interface that can receive user inputs.

Operational Example Including the Employment of State Channels

Figure 6:
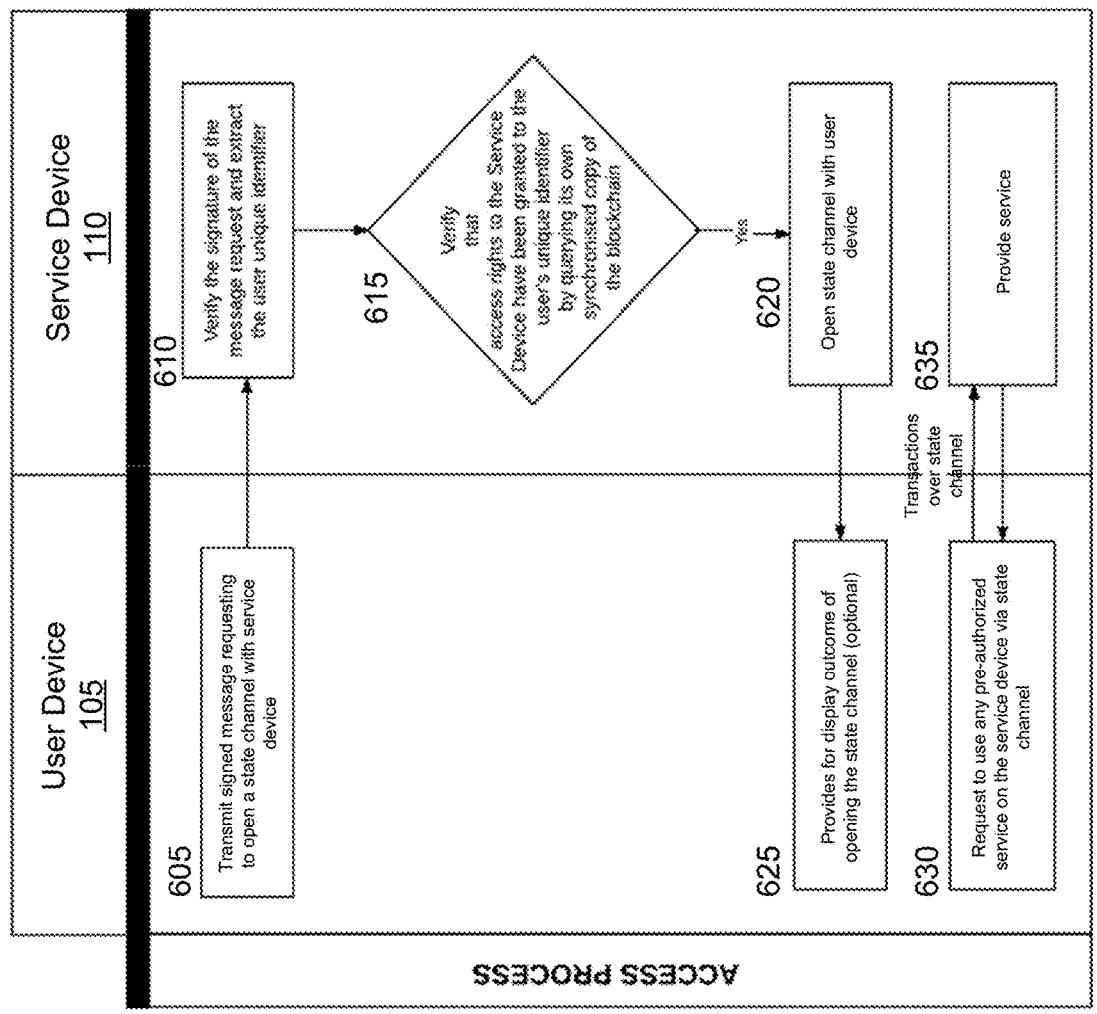
FIG. 6 depicts an interaction diagram that depicts the use of state channels, in accordance with an embodiment.

FIG. 6 depicts an access process flowchart detailing an embodiment that includes the use of state channels. A state channel enables communications such that the user device 105 can send multiple transactions for multiple different services (or repeated services) from a service device 110 (or multiple service devices belonging to the same owner). Therefore, the user device 105 and service device 110 tally the costs associated with the provided services over the state channel and can settle the multiple transactions through a single payment via a smart contract 115 on the blockchain 120 when the state channel is closed.

As one example, the service device 110 may be a lock which may need to be locked/unlocked multiple times over a time period. Therefore, instead of settling a payment with the smart contract 115 on the blockchain 120 after every lock/unlock, the service device 110 can settle after the state channel is closed. In various embodiments, a state channel can be closed after a pre-determined amount of time or pre-determined number of locks/unlocks.

Although FIG. 6 depicts state channel communications between a user device 105 and a single service device 110, one skilled in the art may also appreciate that state channels can be employed in relation to a proxy device 550 (e.g., as described in FIG. 5A). Therefore, the user device 105 may provide multiple requests to the proxy device 550 across a state channel that is open between the user device 105 and the proxy device 550. Therefore, the proxy device 550 may verify the multiple requests and appropriately instruct the service device 110 to provide the requested services. The user device 105 and the proxy device 550 may settle the payment for the provided services after the state channel is closed.

As a specific example, the proxy device 550 may be placed in a hotel room. The services that the hotel room can provide may include, but are not limited to, unlocking the door to provide access to the room, providing access to drinks in the mini-fridge of the hotel room, providing access to a movie on the television of the hotel room, and/or checking out of the hotel room after the stay is over. Each service corresponds to a service device 110 in the hotel room that is in communication with a proxy device 550 of the hotel room. In this scenario, a user device 105 can employ state channels that enable communication between the user device 105 and the proxy device 550 in communication with multiple service devices 110. Therefore, the smart contract 115 on the blockchain 120 receives a single payment for multiple services provided by service devices 110 in communication with a proxy device 550 when the state channel is closed.

Referring to the interaction diagram shown in FIG. 6, the user device transmits 605 an electronically signed message to the service device 110 (or the proxy device 550). Here, the user device 105 generates a message that requests the service device 110 to open a state channel. In various embodiments, the message can include the user identifier assigned to the user of the user device 105. Additionally, the message may include details such as how long the state channel is to remain open (e.g., duration or maximum cost or number of provided services). The user device 105 electronically signs the message by encrypting the message using the private key assigned to the user and further includes the public key assigned to the user.

The service device 110 receives the electronically signed message, verifies 610 the signature of the message request, and extracts the user identifier. For example, the service device 110 performs a cryptographic signature validation to verify the electronically signed message. The service device 110 decrypts the signed message using the public key and extracts the user identifier. The service device 110 verifies 615 that the extracted user identifier has access rights to the service device by querying the locally stored synchronized copy of the blockchain.

Once the service device 110 has verified that the user device 105 has access to the service device, the service device opens 620 the state channel. Optionally, the user device 105 may provide for display 625 the outcome of the opening of the state channel to inform the user. While the state channel remains open between the user device 105 and the service device 110, the user device 105 can request 630 for one or more services of the service device 110 by sending one or more signed messages. The service device 110 can provide 635 the requested one or more services in response to the request from the user device 105 due to the fact that the signed request was received through a state channel. During this time, the user device 105 and service device 110 manages a tally of the services that have been provided since the state channel was opened. Steps 630 and 635 may continue until the state channel is closed. The closing of a state channel may be due to a pre-determined expiration of the state channel due to time (e.g., end of the day) or due to a total number of services (e.g., close after providing ten services), but also if a predetermined total cost of operating the services has been reached, and so forth. In some embodiments, upon closure of the state channel, the costs of the provided services are settled via a smart contract 115 on the blockchain 120. In other example embodiments, the user device 105 or service device 110 need not wait until the state channel is closed and can settle the costs of the provided services at a pre-determined interval.

Operational Example of a Gateway Client Device

Figure 7A:
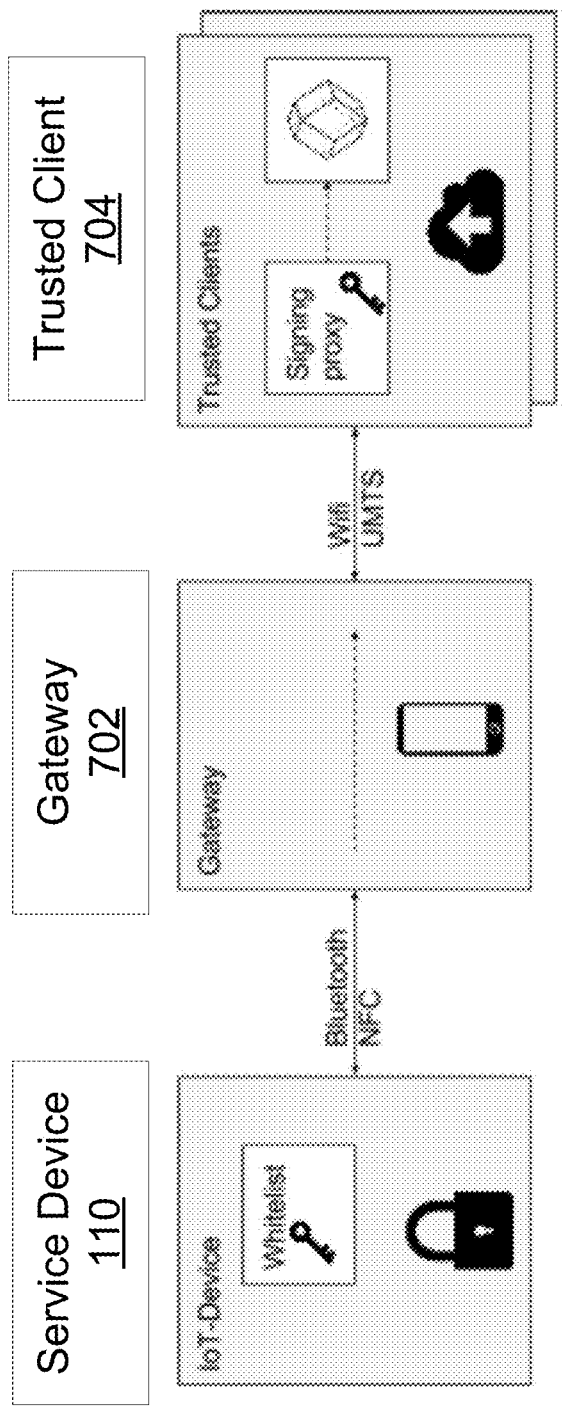
FIG. 7A depicts a service device that accesses the blockchain through a user device, in accordance with an embodiment.
Figure 7B:
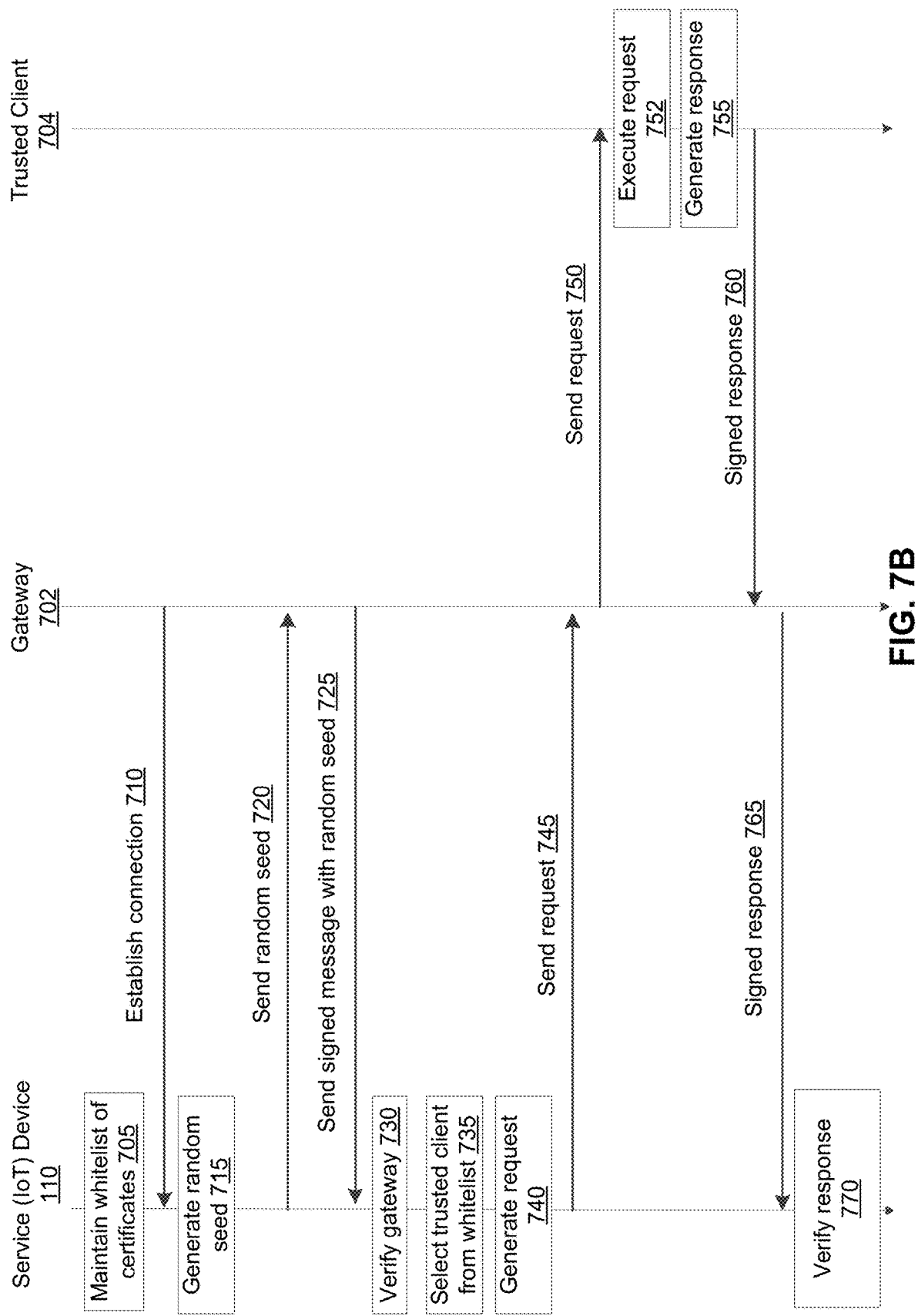
FIG. 7B is an interaction diagram that depicts the interactions between the service device, user device, and trusted client, in accordance with the embodiment shown in FIG. 7A.

Referring to FIGS. 7A and 7B, in another embodiment the service device 110 may not have the capability to directly communicate with the blockchain 120. For example, the service device 110 may be without internet connectivity. Therefore, the service device 110, also referred to as an IoT device in FIG. 7A, employs the internet capable, user device 105, also referred to as a gateway in FIG. 7A, to communicate with a trusted client 704 in FIG. 7A, that has access to the blockchain 120.

The service device 110 itself does not need to have an internet connection enabled. It can communicate with the user device 105 via other communication mediums. For example, communication may be established via BLUETOOTH, near field communication (NFC), or any other similar technology as long as this communication channel enables bi-directional sending of messages. The service device 110 can further include a memory that stores a whitelist that includes information of trusted clients 710. Additionally, the service device 110 can validate cryptographic signatures, such as a cryptographic signature included as a part of a request from the user device 105.

The gateway 702 may be any device and can support a communication channel (e.g., BLUETOOTH, NFC) with the service device 110. An example of the gateway 702 can be the user device 105. In some embodiments, the gateway 702 can hold a public/private key pair and signs messages with the public key. Therefore, the gateway 702 can initiate the validation-process by sending a signed message to the service device 110. The gateway 702 offers its internet connection to the service device 110 in order to connect to the blockchain 120 using trusted clients 710.

Trusted clients 710 may be services offered by many different hosts which give access to the blockchain 120. Each trusted client 704 can operate as a node in the blockchain 120 which is always synced (using a client similar to geth, eth, parity, and the like). Additionally, each trusted client 704 has access to a private key and can sign requests.

During set up, the owner of the service device 110 deploys a smart contract 115 on the blockchain 120 for the service device 110. Here, values can be written into the storage (e.g., memory) of the service device 110. Values can include an initial whitelist of trusted clients 704, as set by the owner of the service device.

Referring to FIG. 7B, it depicts the process of enabling blockchain access by the service device 110 through the user device 105 and trusted client 704, in accordance with an example embodiment. Specifically, as shown in FIG. 7B, the service device 110 (IoT device) maintains 705 a whitelist of certificates that manages a list of trusted client instances which are considered secure. The whitelist can include information of the trusted clients 710 such as the internet protocol address of the trusted client 704 and port/public key of the trusted client 704. The whitelist itself may be stored as smart contract 115 on the blockchain 120. This whitelist may be managed by either a foundation or group of users using a multisig to decide about each node instance or by corporates which could use it in order to centrally control a list of nodes. In order to make sure the whitelist is always up-to-date and contains no failed or non-existing nodes, a cronjob or similar may observe the entries in the list and run test-requests comparing the results with an independent client. In case the results do not match, this client is removed from the list.

The service device 110 first verifies the gateway 702 device (steps 710-730). The gateway 702 establishes 710 a connection with the service device. The service device generates 715 a random number (e.g., a random seed) and sends 720 the random seed to the gateway. This seed will ensure that messages cannot be reused and prevents a man in the middle-attack.

An example of a request to establish a connection (e.g., step 710) sent by the gateway 702 may be:

```
{
    "jsonrpc": "2.0",
    "method": "request",
    "params": [ ]
    "id":"1"
}
```

A response from service device that includes the random seed (e.g., step 720) can be expressed as:

```
{
    "jsonrpc": "2.0",
    "result": { "seed" : "12AE3B6F3AD76E5B2" }
    "id":"1"
}
```

Once the gateway has received the seed, the gateway sends 725 a signed message. This can occur through Bluetooth, NFC, or any similar technology. The generation of such a message could take the following form:

```
var msgHash = seed + sender + method;
ethUtil. ecsign (msgHash, privateKey)
``` leading to the creation of the following signed message:

```
{
"jsonrpc": "2.0",
"method": "open",
"params": {
        "sender" : "5e1d3a76fbf824220eafc8c79ad578ad2b67d01b0c2425eb1f1347e8f50882ab",
        "v": "1c",
        "r": "5e1d3a76fbf824220eafc8c79ad578ad2b67d01b0c2425eb1f1347e8f50882ab",
        "s": "5bd428537f05f9830e93792f90ea6a3e2d1ee84952dd96edbae9f658f831ab13"
}
"id":"1"
}
```

The service device 110 may verify 730 the signed message from the gateway 702. For example, the service device 110 can derive the public key from the gateway's signed message. This verification could take the form of the following pseudo code:

```
senderPubKey=ethUtil.ecrecover(msgHash,v,r,s)
```

If the public key derived from the above matches the key passed as part of the message, the service device confirms that the message was indeed sent by the gateway 702 specified in the message.

After verifying the gateway's identity, the service device 110 determines whether the owner of this public key is also authorized to use the service device 110. The service device 110 selects 735 a trusted client 704 that is maintained on its whitelist and generates 740 a request that is sent 745 to the gateway 702. Here, a request that is sent to the gateway 702 can be a request to poll the smart contract 115 stored on the blockchain 120 to check whether there is a state change (e.g., see step 460).

The generation of such a request could take the following form:
function hasPermission (address user, uint commandCode) constant returns(boolean is-allowed)
And the request (e.g., request sent at step 745) itself may be represented by the following pseudocode:

```
{
"jsonrpc": "2.0",
"method": "eth_call",
"params": [{
    // address of the smart contract controlling the device
    "to" : "5e1d3a76fbf824220eafc8c79ad578ad2b67d01b0c2425eb1f1347e8f50882ab",
    // Hash of the method signature and encoded parameters (user, commandCode).
    "data":
"220eafc8c79ad578ad2b67d01b0c24255e1d3a76fbf82423BAF9eb1f1347e8f50882ab"
}]
"id":"2",
"client" : "10.25.125.196:8555",
"seed" : "8c79ad578ad2b67d01b0c24255e1d"
}
```

When the gateway 702 receives such a request including a client and seed parameters, it will establish an HTTP (or https) connection to the specified trusted client 704 and forward 750 the request. The request may take the form of a POST request to the server hosting the trusted client 704. This request will be received by the trusted client 704 which will then execute the Service Device's query on the trusted client 752. The trusted client 704 generates 755 a signed response in the form of a message signed using the trusted client's private key. The generation of such a response could take the following form:
   var    msgHash=crypto.SHA256(request. method+ JSON.stringify(request. params)+request. seed +JSON.stringify(response. result));
   ethUtil. ecsign (msgHash, privateKey)

The response message (e.g., generated at step 755) may contain the result of query, may add a signed field, and may be represented by the following pseudocode:

```
{
"jsonrpc": "2.0",
"result": "0x1",
"sign": {
    "v": "1c",
    "r": "5e1d3a76fbf824220eafc8c79ad578ad2b67d01b0c2425eb1f1347e8f50882ab",
    "s": "5bd428537f05f9830e93792f90ea6a3e2d1ee84952dd96edbae9f658f831ab13"
},
"id":"2"
}
```

As an example, the response message (e.g., generated at step 755) may include the changes to the smart contract 115 or can include a queued service device request. Therefore, when this information is received by the service device 110, the service device 110 can update its locally stored smart contract 115 with the changes to the smart contract 115 or provide a service in response to the queued service device request.

The trusted client sends (or transmits) 760 this signed message to the gateway 702 which then forwards 765 this response to the service device 110. The service device 110 verifies 770 the signature of the trusted client 704 in the received data package. This may be done by extracting the public key of the trusted client 704 from the message and comparing it to one stored in the service device's 110 whitelist.

In one embodiment, the service device 110 returns a message to the gateway 702 if the signature of the message is valid. The returned message to the gateway 702 could include a success or failure result, depending on whether or not the query by the trusted client 704 was successful, and could take the form of the following pseudocode:

```
{
    "jsonrpc": "2.0",
    "result": true
    "id":"1"
}
```

Additional Considerations

The disclosed embodiments of the blockchain enabled environment enables the accessing of services from various service devices while leveraging the decentralized blockchain. The benefits of the disclosed embodiments are several-fold.

By way of example, an implementation of a smart contract on the decentralized blockchain that governs a particular service device ensures the secure exchange of services and payments. For example, as a distributed ledger, the blockchain can ensure that the payments are immutably recorded on the distributed ledger.

Also by way of example, an ability for a user device to leverage the decentralized blockchain ensures that a user of the user device can readily access a service device without the need for a middle man. As a particular example, a user of a user device can provide payments to a smart contract corresponding to a hotel room on the blockchain. Therefore, the user can book the hotel room for a particular range of dates. When the user arrives at the hotel room, instead of having to check in at a front desk to obtain keys to the hotel room, the user can use the user device to gain access to the hotel room by unlocking lock of the hotel room (e.g., the service device).

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving an electronically signed request from a user device to access a service device, the electronically signed request comprising:
      a user identifier assigned to the user of the user device; and
      one or more parameters related to a service provided by the service device;
   verifying the one or more parameters of the electronically signed request satisfy conditions for access;
   updating a permission data structure specific for the service device stored on a decentralized ledger, the permission data structure comprising a plurality of user identifiers and an indication of whether each user identifier is authorized to access the service device;
   providing changes to the permission data structure stored on the decentralized ledger, the provided changes used to update a locally stored permission data structure;
   receiving a plurality of requests from the user device through a state channel for the service;
   providing, for each request in the plurality, the service to the user of the user device;
   detecting that a pre-determined expiration of the state channel has occurred; and
   providing a request indicating a total number of services provided for the plurality of requests received through the state channel.

2. The method of claim 1, further comprising:
   receiving, from the user device, an electronically signed message requesting for the service to be provided by the service device, the signed message comprising the user identifier assigned to the user of the user device;
   verifying that the user device is authorized to access the service device based on the user identifier included in the signed message; and
   generating, responsive to the verification, a service device request for the service device, wherein the changes provided to the service device comprise the service device request that causes the service device to provide the service.

3. The method of claim 2, further comprising:
   receiving a request to settle a payment for multiple services provided by the service device, the request provided by the service device in response to the predetermined expiration of the state channel.

4. The method of claim 2, wherein verifying that the user device is authorized to access the service device based on the user identifier included in the signed message comprises:
   extracting the user identifier assigned to the user of the user device from the signed request;
   accessing the updated permission data structure specific for the service device; and
   comparing the extracted user identifier to the plurality of user identifiers stored in the permission data structure.

5. The method of claim 4, wherein extracting the user identifier comprises:
   decrypting the signed request using a public key assigned to the user identifier of the user device.

6. The method of claim 1, wherein verifying the one or more parameters of the signed request satisfy conditions for access comprises:
   accessing a contract stored on the decentralized ledger, the contract specific for the service device; and
   comparing variables of the accessed contract to the one or more parameters of the signed request.

7. The method of claim 1, wherein the one or more parameters of the signed request include one of a payment, availability dates, or availability times.

8. The method of claim 1, wherein the changes to the permission data structure are provided to one of a user device, service device, or a proxy device to update the locally stored permission data structure.

9. A non-transitory computer readable storage medium comprising instructions that, when executed by a processor, cause the processor to:
receive an electronically signed request from a user device to access a service device, the electronically signed request comprising:
a user identifier assigned to the user of the user device; and
one or more parameters related to a service provided by the service device;
verify the one or more parameters of the electronically signed request satisfy conditions for access;
update a permission data structure specific for the service device stored on a decentralized ledger, the permission data structure comprising a plurality of user identifiers and an indication of whether each user identifier is authorized to access the service device;
provide changes to the permission data structure stored on the decentralized ledger, the provided changes used to update a locally stored permission data structure;
receive a plurality of requests from the user device through a state channel for the service;
provide, for each request in the plurality, the service to the user of the user device;
detect that a pre-determined expiration of the state channel has occurred; and
provide a request indicating a total number of services provided for the plurality of requests received through the state channel.

10. The non-transitory computer readable storage medium of claim 9, further comprising instructions that, when executed by the processor, cause the processor to:
receive, from the user device, an electronically signed message requesting for the service to be provided by the service device, the signed message comprising the user identifier assigned to the user of the user device;
verify that the user device is authorized to access the service device based on the user identifier included in the signed message; and
generate, responsive to the verification, a service device request for the service device, wherein the changes provided to the service device comprise the service device request that causes the service device to provide the service.

11. The non-transitory computer readable storage medium of claim 10, further comprising instructions that, when executed by the processor, cause the processor to:
receive a request to settle a payment for multiple services provided by the service device, the request provided by the service device in response to the predetermined expiration of the state channel.

12. The non-transitory computer readable storage medium of claim 10, wherein the instructions that causes the processor to verify that the user device is authorized to access the service device based on the user identifier included in the signed message further comprises instructions that, when executed by the processor, cause the processor to:
extract the user identifier assigned to the user of the user device from the signed request;
access the updated permission data structure specific for the service device; and
compare the extracted user identifier to the plurality of user identifiers stored in the permission data structure.

13. The non-transitory computer readable storage medium of claim 9, wherein the code that causes the processor to verify the one or more parameters of the signed request satisfy conditions for access further comprises instructions that, when executed by the processor, cause the processor to:
access a contract stored on the decentralized ledger, the contract specific for the service device; and
compare variables of the accessed contract to the one or more parameters of the signed request.

14. A method comprising:
receiving a signed message from a user device requesting for a service, the signed message comprising a user identifier assigned to the user of the user device;
extracting the user identifier assigned to the user of the user device;
verifying the user identifier assigned to the user of the user device is authorized to access the service device by querying a locally stored permission data structure polled from a distributed ledger;
opening, responsive to verifying that the user identifier is authorized to access the service device, a state channel with the user device, the state channel enabling the user device to receive additional services provided by the service device;
receiving a plurality of requests from the user device through the state channel for the service;
providing, for each request in the plurality, the service to the user of the user device;
detecting that a pre-determined expiration of the state channel has occurred; and
providing a request indicating a total number of services provided for the plurality of requests received through the state channel.

15. The method of claim 14, wherein causing to provide the service comprises:
sending, by a proxy device in communication with a plurality of service devices, an instruction to the service device to provide the service; and
receiving, by the proxy device from the service device, a response indicating that the service was provided.

16. The method of claim 14, further comprising:
receiving changes to a permission data structure stored on the distributed ledger, the permission data structure specific for the service device; and
updating the locally stored permission data structure with the received changes, wherein the updated permission data comprising a plurality of user identifiers and an indication of whether each user identifier is able to access the service device.

17. The method of claim 14, wherein verifying the user identifier comprises:
querying the locally stored permission data structure, the locally stored permission data structure comprising a plurality of user identifiers and an indication whether each user identifier is authorized to access the service device; and
comparing the extracted user identifier to the plurality of user identifiers stored in the locally stored permission data structure.

18. The method of claim 1, wherein a request of the plurality requests is to lock or unlock a device.

19. The non-transitory computer readable storage medium of claim 9, wherein a request of the plurality requests is to lock or unlock a device.

20. The method of claim 14, wherein a request of the plurality requests is to lock or unlock a device.

\* \* \* \* \*